US005327397A

United States Patent [19]

Burke et al.

[11] Patent Number: 5,327,397

[45] Date of Patent: Jul. 5, 1994

[54] WIDEBAND, DERIVATIVE-MATCHED, CONTINUOUS APERTURE ACOUSTIC TRANSDUCER

[75] Inventors: Shawn E. Burke, Andover, Mass.; James E. Hubbard, Jr., Derry, N.H.

[73] Assignee: The Charles Stark Draper Laboratories, Inc., Cambridge, Mass.

[21] Appl. No.: 68,996

[22] Filed: May 27, 1993

Related U.S. Application Data

[62] Division of Ser. No. 677,799, Mar. 29, 1991, Pat. No. 5,237,542.

[51] Int. Cl.[5] .................... G01S 15/00; H04R 17/00

[52] U.S. Cl. .................... 367/103; 367/119; 367/124; 367/153; 367/157; 310/334; 310/337

[58] Field of Search .............. 367/103, 105, 119, 121, 367/122, 124, 125, 126, 129, 153, 157, 905; 310/322, 334, 337

[56] References Cited

U.S. PATENT DOCUMENTS

| | | | |
|---|---|---|---|
| 4,166,999 | 9/1979 | Brady, III | 367/105 |
| 4,167,753 | 9/1979 | Lynk | 358/140 |
| 4,460,841 | 7/1984 | Smith et al. | 310/334 |
| 5,237,542 | 8/1993 | Burke et al. | 367/103 |

*Primary Examiner*—J. Woodrow Eldred

*Attorney, Agent, or Firm*—Joseph S. Iandiorio; Kirk Teska

[57] ABSTRACT

A wideband, derivative-matched, continuous aperture acoustic transducer includes a first sensor area having a predetermined spatial shading and a second sensor area having a spatial shading which is the spatial derivative of the spatial shading of the first area; the first and second spatial shaded areas are superimposed and co-extensive along the sensing axis.

5 Claims, 7 Drawing Sheets

WIDEBAND, DERIVATIVE-MATCHED, CONTINUOUS APERTURE ACOUSTIC TRANSDUCER

This is a division of application Ser. No. 07/677,799, filed Mar. 29, 1991, now U.S. Pat. No. 5,237,542.

FIELD OF INVENTION

This invention relates to a wideband, derivative-matched, continuous aperture acoustic transducer.

BACKGROUND OF INVENTION

Conventional sonar systems traditionally consist of a plurality of discrete transducers aligned in linear or planar arrays. Directional resolution is accomplished through analog or digital electronics by beam steering. Such systems usually require a large number of discrete transducers and electronics which includes signal conditioning amplifiers and digital computers. These are complex systems which are large, heavy, difficult to maintain and calibrate, expensive, and require significant electrical power.

One recent approach proposes an alternative means for obtaining high resolution without steering using derivative matched spatially shaded sensing apertures consisting of a number of discrete sensors. However, this implementation introduces directional ambiguities and/or implicit bandwidth limitations to prevent spatial aliasing. In addition, a large number of discrete sensors is required which continues the problem of large size, weight, expense, maintenance and calibration.

SUMMARY OF THE INVENTION

It is therefore an object of this invention to provide an improved transducer particularly advantageous for sonar systems.

It is a further object of this invention to provide such an improved transducer which enjoys derivative matching advantages without the attendant need for a large number of discrete sensors and associated electronics.

It is a further object of this invention to provide such an improved transducer which has wideband capability without spatial aliasing.

It is a further object of this invention to provide such an improved transducer which eliminates directional ambiguities occurring with discrete sensor elements.

It is a further object of this invention to provide such an improved transducer which is smaller, lighter, less expensive, and easier to calibrate and maintain.

The invention results from the realization that an extremely simple yet accurate wideband, derivative-matched, continuous aperture acoustic sensing system can be achieved by effecting the derivative-matched shading, physically, in the transducer with two sensor areas, one of which possesses a shading which is the spatial derivative of the other and with the two sensor areas superimposed and coincident along the scanning axis.

This invention features a wideband, derivative-matched, continuous aperture acoustic transducer. There is a first sensor area having a predetermined spatial shading and a second sensor area having a spatial shading which is the spatial derivative of the spatial shading of the first area. The first and second spatially shaded areas are superimposed and coextensive along the sensing axis.

In a preferred embodiment, there are means for combining the output of the first sensor area with the output of the second sensor area to obtain a signal proportional to the cosine of the angle of incidence of an acoustic wavefront. The means for combining may include means for integrating and scaling the output of the second sensor and means for dividing the output of this integrated and scaled second sensor signal by the output of the first sensor. One of the sensor areas may include at least a portion of the other sensor area or all of the other sensor area. Typically the first sensor area includes the second sensor area. The shape of the second sensor area may be the spatial derivative of the shape of the first sensor area, or the spatial varying sensitivity characteristic of the second sensor area may be the spatial derivative of the Spatially varying sensitivity characteristic of the first sensor area. The spatially varying sensitivity characteristic may be piezoelectric sensitivity.

The transducer may include a pair of electrodes and a sensor medium between them. The first and second sensor areas may be defined in and contained in the sensor medium, or the first and second sensor areas may be defined by an electrode and contained in the sensor medium. The transducer may include a first sensor medium and a second sensor medium and electrode means for sensing the output of the sensor mediums. Then the first sensor medium includes the first sensor area and the second sensor medium includes the second sensor area.

The first sensor area may be rhombic and the second sensor area rectangular. Or, the first sensor area may be triangular and the second sensor area rectangular; or, the first sensor area may be sinusoidal and the second cosinusoidal.

The transducer may include a third sensor area superimposed on the first and second sensor areas and have a plurality of independent sensor sections which may be conventionally processed.

DISCLOSURE OF PREFERRED EMBODIMENT

Other objects, features and advantages will occur to those skilled in the art from the following description of a preferred embodiment and the accompanying drawings, in which.

Figure 1:
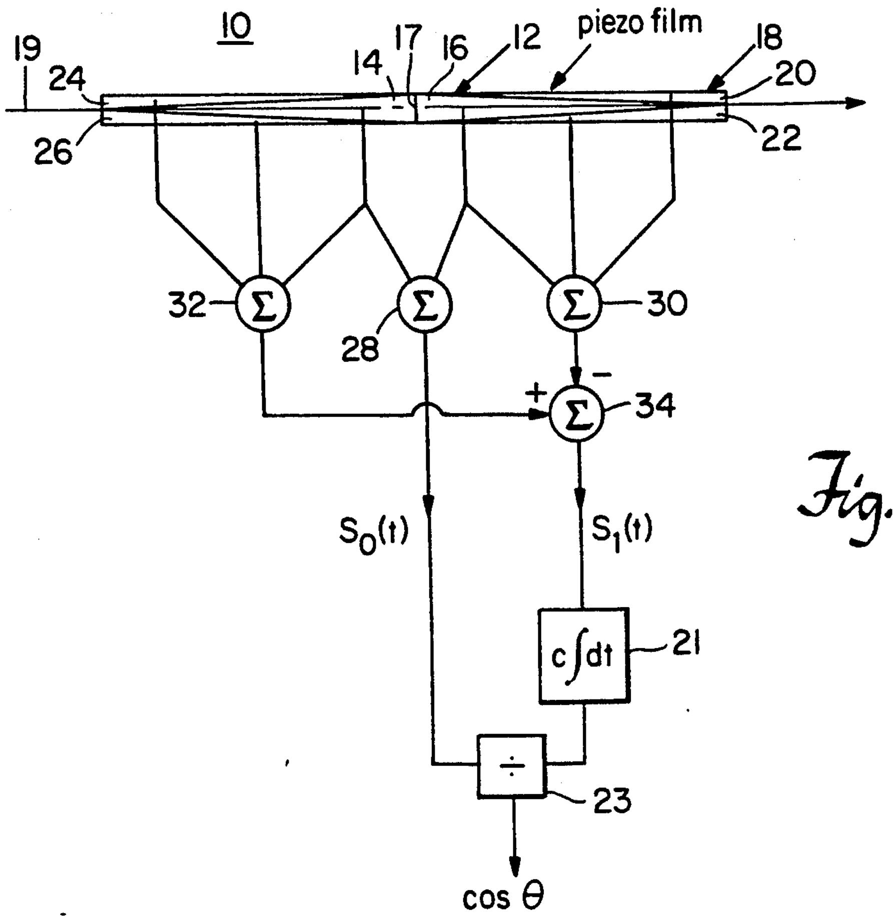
FIG. 1 is a schematic plan view of a transducer using rhombic and rectangular areas according to this invention.
Figure 10:
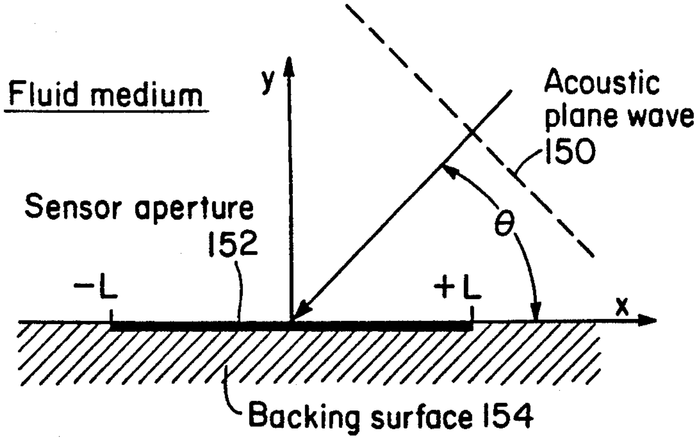
Figure 11:
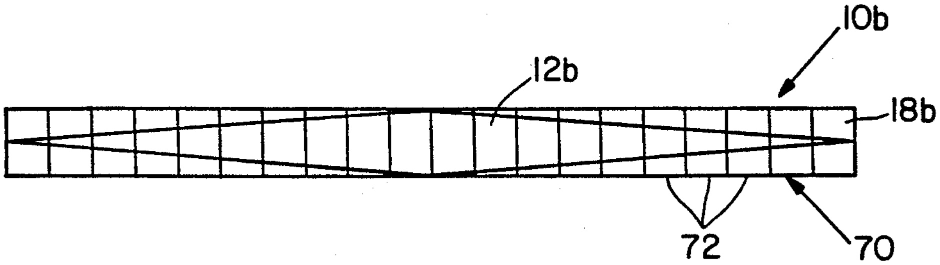
Figure 12:
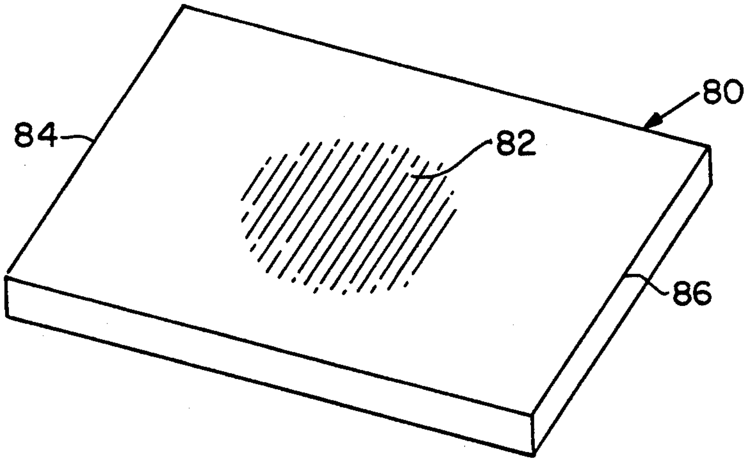
Figure 13:
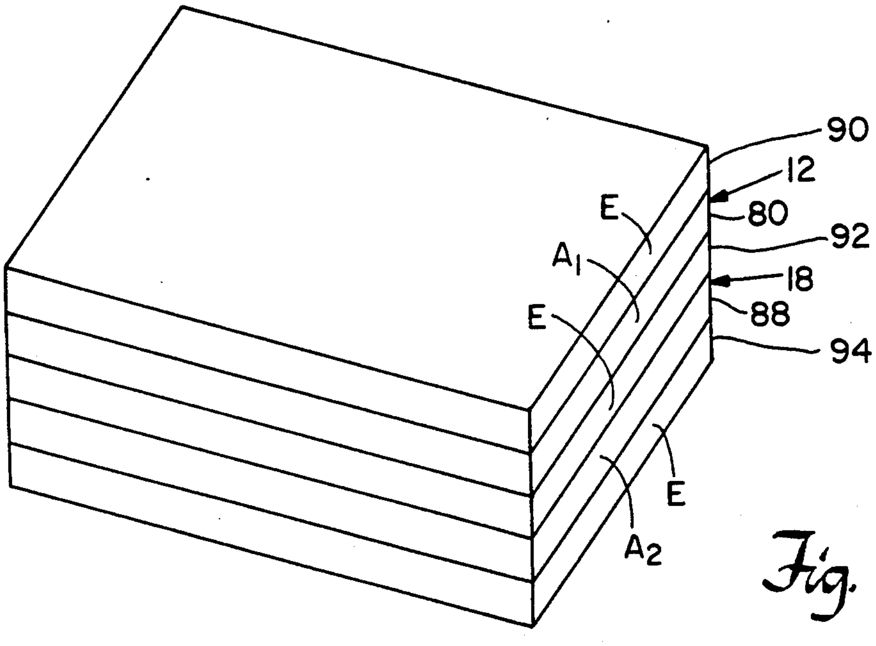
Figure 14:
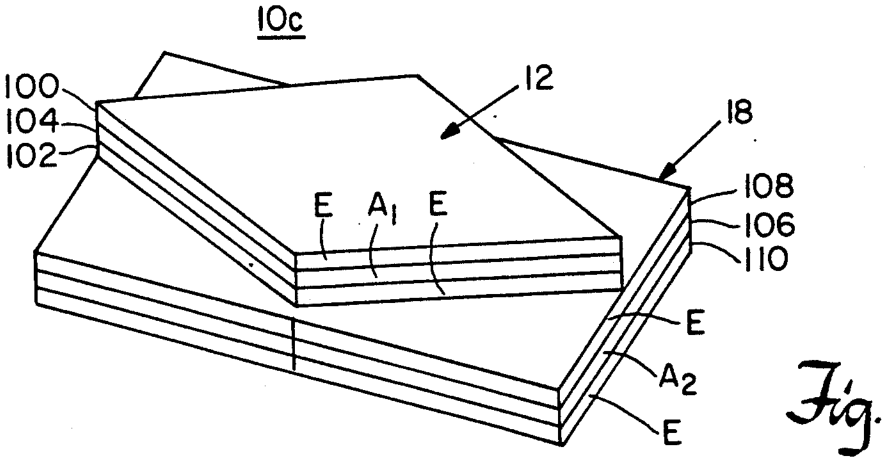
Figure 15:
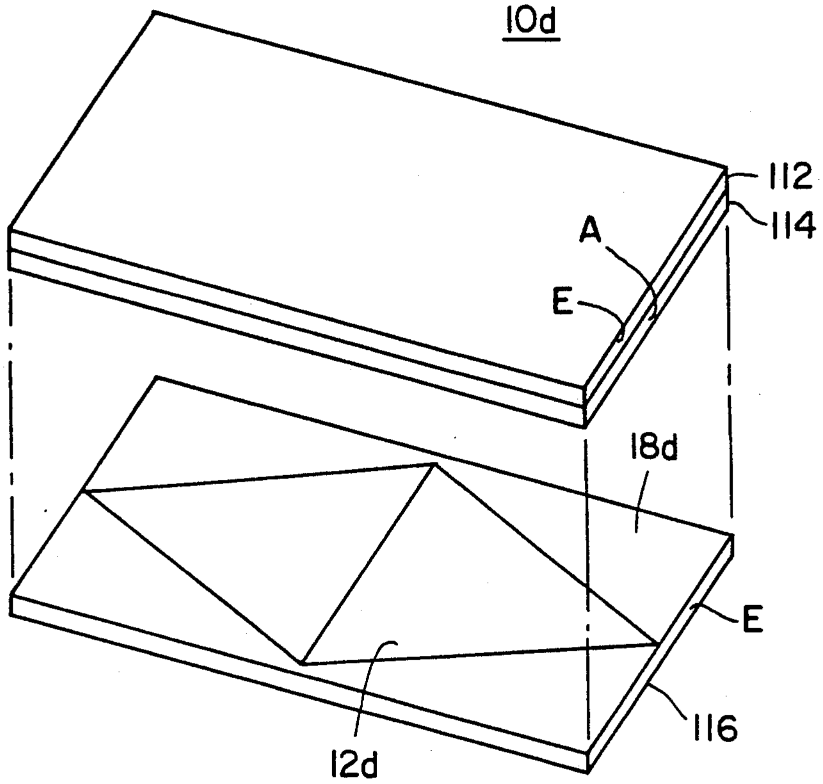
Figure 16:
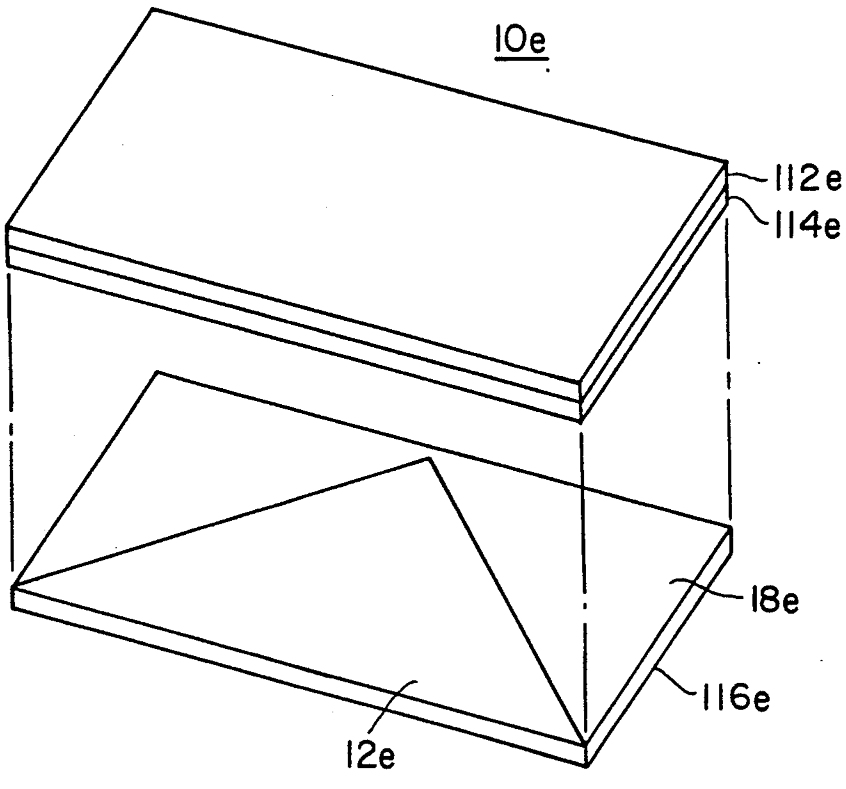
Figure 17:
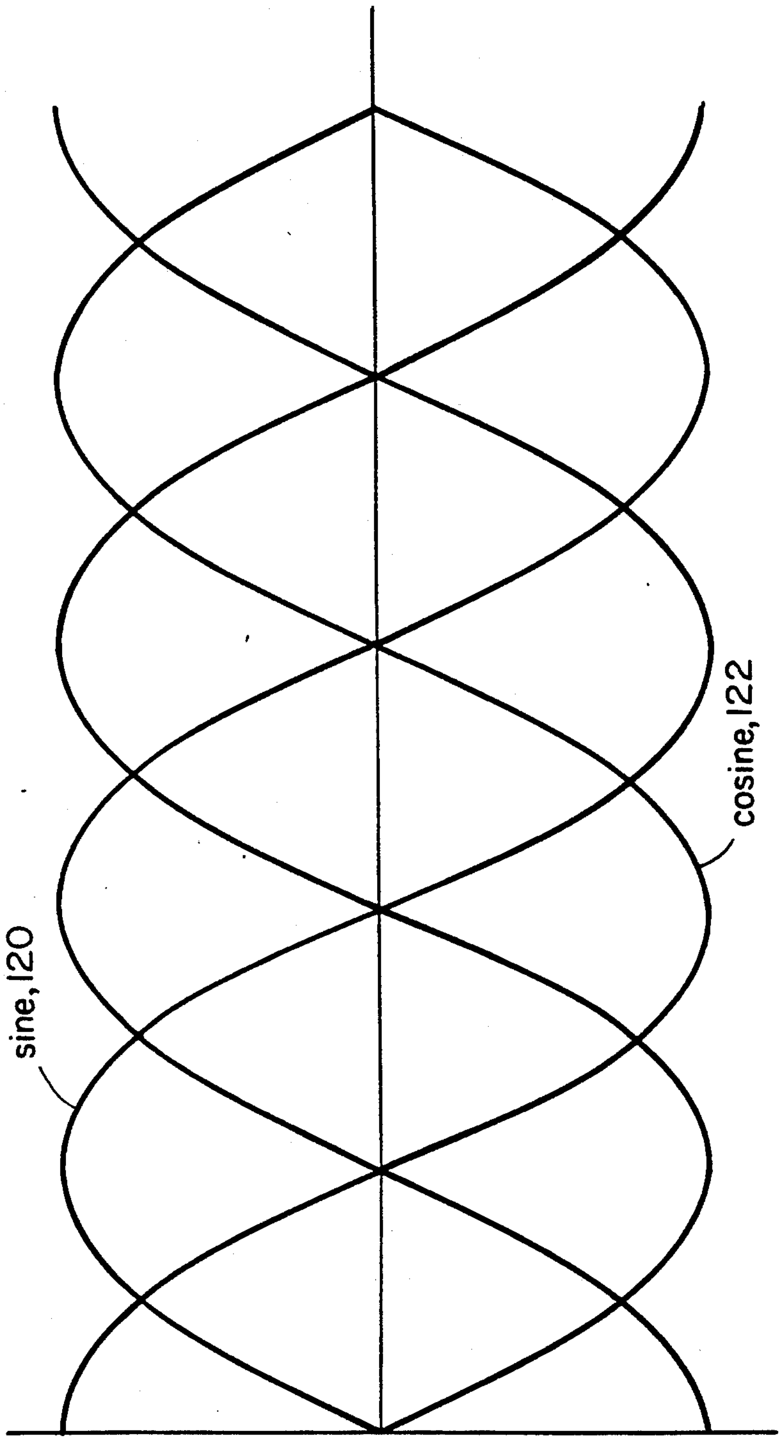

1 with the transducers stacked laterally, orthogonal to the sensing axis;

FIG. 10 is a schematic view defining the geometry wherein an obliquely-incident acoustic plane wave impinges on the transducer aperture;

FIG. 11 is an enlarged schematic plan view of a transducer similar to FIG. 1 including a third sensor area superimposed on the first two and including a plurality of sensor sections;

FIG. 12 is a schematic illustration of a piezoelectric layer with spatially variable sensitivity;

FIG. 13 is a three-dimensional diagrammatic view of a transducer according to this invention using the spatially varied piezoelectric layer of FIG. 12;

FIG. 14 is a three-dimensional diagrammatic view of a transducer in which the two sensor areas are formed of independent sensing material;

FIG. 15 is a three-dimensional diagrammatic exploded view of a transducer having rhombic and rectangular sensor areas according to this invention in which the sensor areas are defined by an electrode;

FIG. 16 is a three-dimensional diagrammatic exploded view of a transducer according to this invention having triangular and rectangular sensor areas; and FIG. 17 is an illustration of two sensor areas, one of which is a derivative of the other, in which the areas take the forms of sine and cosine.

Figure 2:
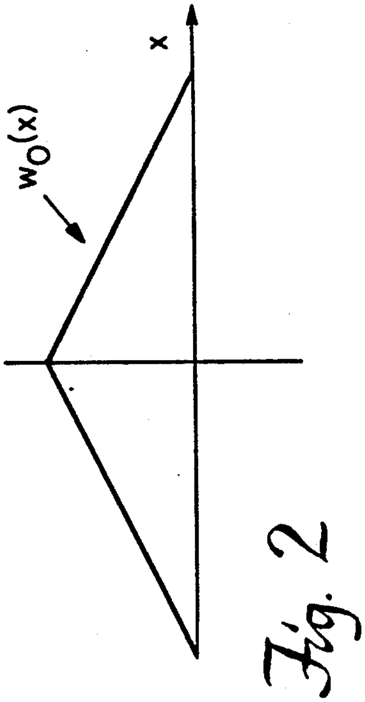
FIG. 2 is an illustration of an aperture shading according to this invention utilized in the transducer of FIG. 1.

There is shown in FIG. 1 transducer 10 according to this invention including a first rhombic-shaped sensor area 12 including two segments 14 and 16 and a rectangular sensor area 18 which is formed from the two rhombic segments 14 and 16 plus the two pairs of end sediments 20, 22 and 24, 26. The outputs from sensor areas 12 and 18 are separately summed. The output from rhombic sensor area 12 is derived from segments 14 and 16 combined in summer 28 to provide the signal $S_0(t)$- The output of the rectangular sensor area 18 is derived from segments 16, 20 and 22 combined in summer 30, and the outputs from segments 14, 24 26 are combined in summer 32. The outputs of summers 30, 32 are then combined in summer 34 to provide the output signal $S_1(t)$. Rhombic sensor area 12 and rectangular sensor area 18 are a set of derivative matched apertures aligned along sensing axis 19. Rhombic sensor area 12 is represented by the triangular shading $w_0(x)$ as shown in FIG. 2. The derivative of $w_0(x)$ is rectangular shading $w_1(x)$ shown in FIG. 3. By simply dividing $S_0(t)$ by $S_1(t)$, temporally integrating, and multiplying by the speed of sound in the acoustic medium, the cosine of the angle of incidence of an acoustic wave can be determined, from which the direction of the wave is obvious- This is accomplished in FIG. 1 by integrating $S_1(t)$ and scaling it by the speed of sound c in integration circuit 21 and then dividing the result by $S_0(t)$ in divider 23 to obtain cos as more fully explained below.

Figure 4:
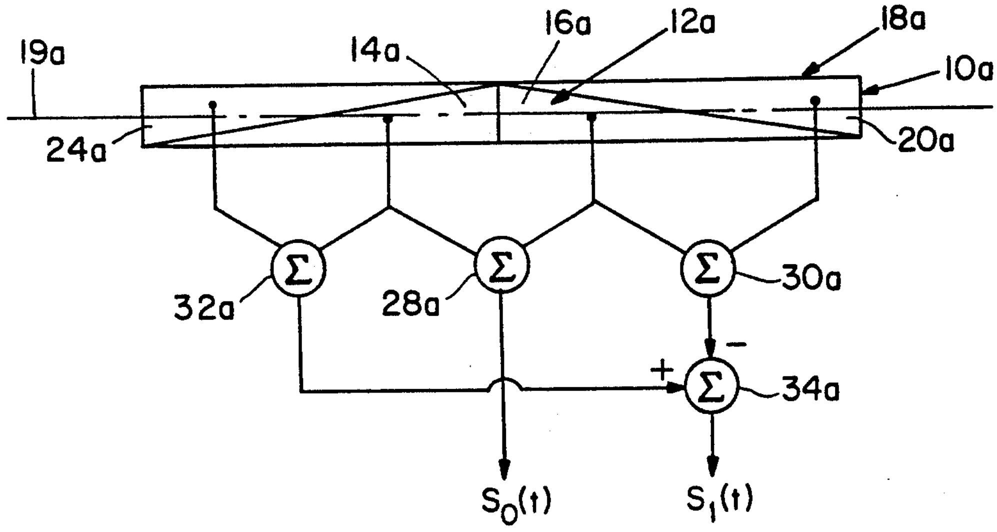
FIG. 4 is a schematic plan view similar to FIG. 1 of a transducer using triangular and rectangular sensor areas.
Figure 3:
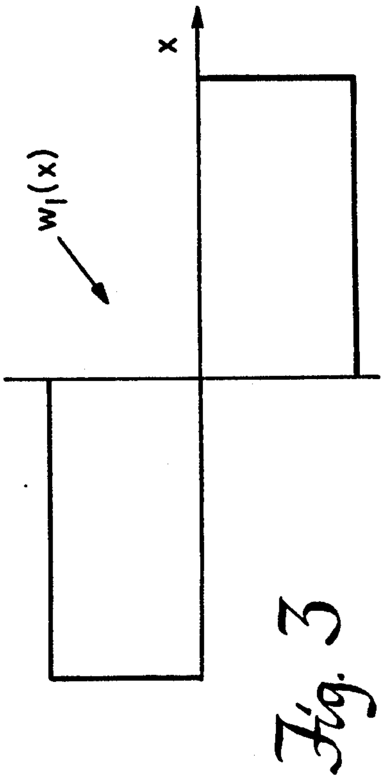
FIG. 3 is the spatial derivative of the aperture shading of FIG. 2.
Figure 6:
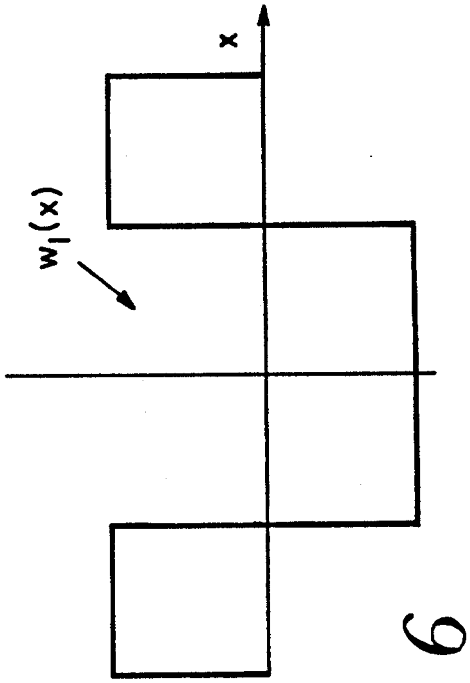
FIG. 6 is the spatial derivative of the aperture shading of FIG. 5.
Figure 5:
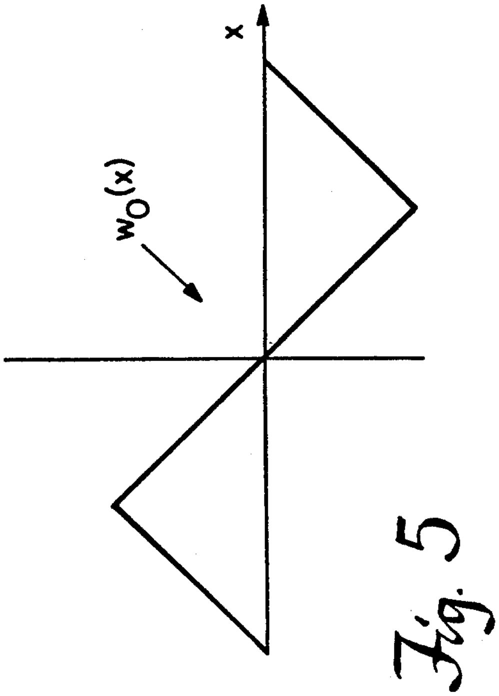
FIG. 5 is a view similar to FIG. 2 of an alternative aperture shading.

The derivative matched apertures of the transducer are not limited to rhombic and rectangular shapes. For example, as shown in FIG. 4, transducer 10*a* may include a triangular sensor area 12*a* and a rectangular sensor area 18*a*. In this case, triangular sensor area 12*a* includes two segments 14*a* and 16*a*, while rectangular area 18*a* includes those two segments 14*a* and 16*a* and two additional segments 20*a* and 24*a*. The two segments 14*a* and 16*a* of triangular sensor area 12*a* are combined in summer 28*a* while the outputs of segments 14*a* and 24*a* are combined in summer 32*a* and the outputs from segments 12*a* and 20*a* are combined in sunnner 30*a*. The output of summer 28*a* is the signal $S_0(t)$ and the output from summers 30*a* and 32*a* are combined in sunnner 34*a* to yield signal $S_1(t)$. These two signals again may be divided and processed to provide the cosine of the incidence angle of an acoustic wave. The form of the apertures represented by the sensor areas 12*a*, 18*a* in FIG. 4 are depicted in FIGS. 2 and 3. FIG. 5 shows a triangular shading, $w_0(x)$, whose derivative, $w_1(x)$, FIG. 6, is a pair of mirror image rectangular shadings. The sensor may be made of piezoelectric material, polyvinyldene fluoride, voided polyvinyldene fluoride, copolymer ($PVF_2/PVF_3$), or other suitable mediums.

Figure 7:
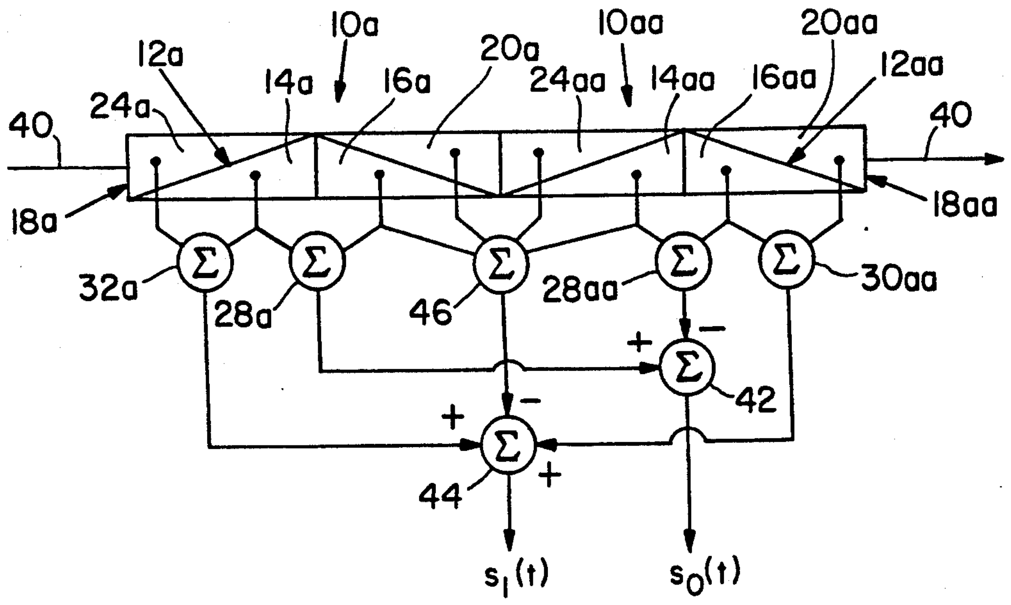
FIG. 7 is a schematic plan view showing a plurality of transducers such as shown in FIG. 4.
Figure 8:
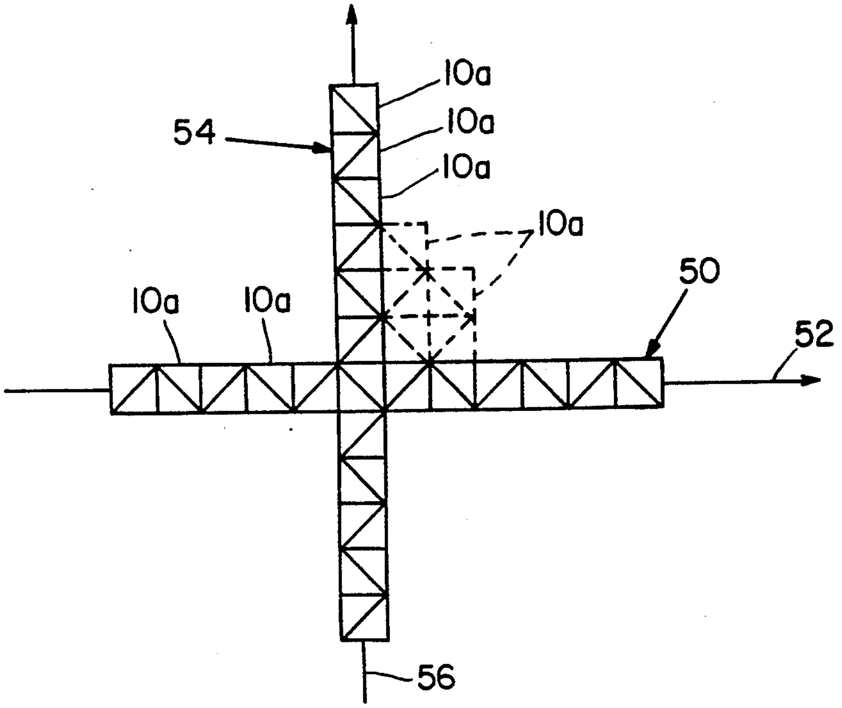
FIG. 8 is a schematic plan view of two pluralities of transducers, one extending vertically, the other horizontally along their respective longitudinal axes, according to this invention.

Although thus far in FIGS. 1 and 4 the transducers are illustrated as having only one stage, this is not a necessary limitation of the invention, for as shown in FIG. 7, two or more transducers 10*a*, 10*aa*, may be assembled along the sensing axis 40. Segments 14*a* and 16*a* are combined in summer 28*a* and segments 14*aa* and 16*aa* of triangular sensor area 12*aa* are combined in summer 28*aa*. The outputs of summers 28*a* and 28*aa* are combined in summer 42 to provide output $S_0(t)$. Segments 24*a*, 14*a*, are combined in summer 32*a* and then submitted to summer 44. The outputs from segments 16*aa* and 20*aa* are combined in summer 30*aa* and delivered to summer 44. Finally, the outputs from segments 16*a* and 20*a* and from 14*aa* and 24*aa* are combined in summer 46, which is shared by both 10*a* and 10*aa* and submitted to summer 44, whose output is $S_1(t)$. A plurality of such devices 10a can be arranged, FIG. 8, in a horizontal array 50 with a horizontal sensing axis 52, and in a vertical array 54 having a vertical sensing axis 56. An entire area array can be made by simply adding additional sensor arrays 10*a* in the area around arrays 50 and 54 as shown in phantom.

Figure 9:
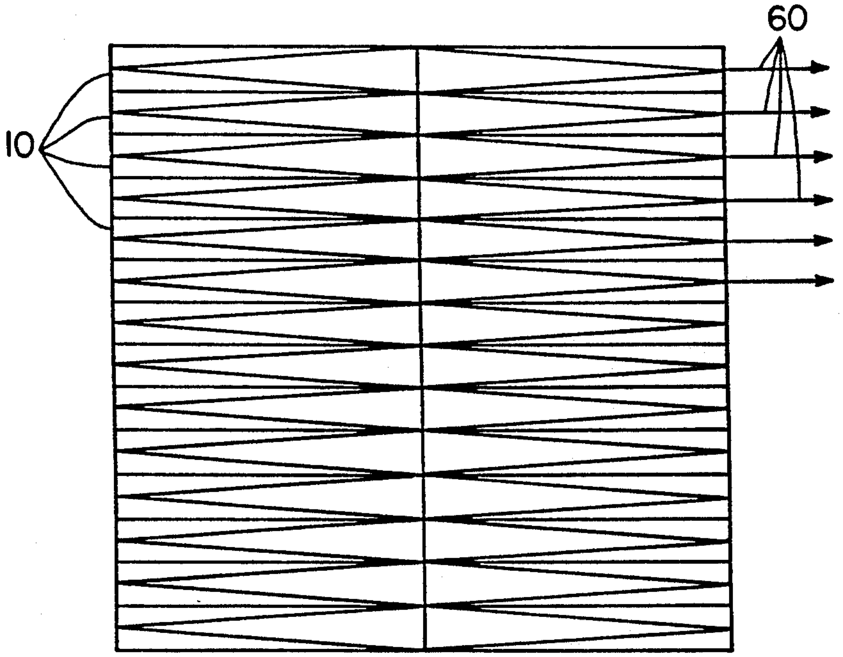
FIG. 9 is a schematic plan view of a transducer according to this invention similar to that shown in FIG.

Several transducers can be stacked laterally as shown in FIG. 9, in a direction transverse to their sensing axes 60 so that monopulse processing occurs horizontally along the sensor axes but conventional steering is applied vertically, in the lateral direction transverse to the sensor axes 60.

It can be seen that the derivative matched apertures provide a progressive spatial phase variation between the output signals $S_0(t)$ and $S_1(t)$, facilitating the resolution of a target's direction cosine, as follows. Consider the oblique incidence geometry depicted in FIG. 10. A monochromatic acoustic plane wave 150 impinges on a surface 152 coincident with the x-axis at an angle $\theta$. This wave may be represented mathematically by $$p(x,t) = P \exp\left[ i\left( \omega t + \frac{\omega x}{c}\cos\theta + \frac{\omega y}{c}\sin\theta \right)\right], \quad (1)$$

where $\omega$ is the angular frequency of the wave, c is the speed of sound in the fluid medium, and P is the complex magnitude of the wave. The sensor aperture is of length 2L, deposited atop the rigid surface 154 along the sensing axis X, and without loss of generality is assumed to have unit width. The output $S_O(t)$ from a sensor having spatial shading $w_0(x)$ is then $$s_0(t) = \int_{-L}^{L} w_0(x) P \exp\left[ i\left( \omega t + \frac{\omega x}{c}\cos\theta \right)\right] dx = \quad (2)$$

$$P \exp(i\omega t)\, \hat{W}_0\left( \frac{\omega}{c}\cos\theta \right),$$

where $\hat{w}_0$ denotes the spatial Fourier transform of the shading $w_0(x)$ with respect to the independent variable $(\omega/c)\cos\theta$. The output $S_1(t)$ from a sensor having spatial shading $w_1(x)$ is $$s_1(t) = \int_{-L}^{L} w_1(x) P \exp\left[i\left(\omega t + \frac{\omega x}{c}\cos\theta\right)\right]dx = P\exp(i\omega t)\,\hat{W}_1\left(\frac{\omega}{c}\cos\theta\right), \quad (3)$$

where $\hat{W}_1$ denotes the spatial Fourier transform of the shading $w_1(x)$ with respect to the independent variable $(\omega/c)\cos\theta$. Since the shading $w_1(x)$ is assumed to be the spatial derivative of the shading $w_0(x)$, $$s_1(t) = \int_{-L}^{L} \frac{d[w_0(x)]}{dx} P \exp\left[i\left(\omega t + \frac{\omega x}{c}\cos\theta\right)\right]dx = i\frac{\omega}{c}\cos\theta\left[P\exp(i\omega t)\,\hat{W}_0\left(\frac{\omega}{c}\cos\theta\right)\right]. \quad (4)$$

Consequently, the ratio of the signals $S_1(t)$ and $S_0(t)$ is $$m \equiv \frac{s_1(t)}{s_0(t)} = i\frac{\omega}{c}\cos\theta. \quad (5)$$

The direction cosine $\cos\theta$, and hence the incidence angle $\theta$, can be inferred from the derivative-matched sensor aperture signal outputs by temporally integrating the ratio m and multiplying by the medium's sound speed c. Since the result is independent of frequency $\omega$, the method is broadband; hence the incident acoustic wave can consist of a more general aggregate spectrum.

Although the transducer of this invention very simply and efficiently detects a target and locates its direction, it may be desirable to obtain additional data from the target. This can be done by adding a third sensor area 70, FIG. 11, which includes a plurality of sensor sections 72 superimposed on rhombic sensor area 12*b* and rectangular sensor area 18*b* so that supplementary data available through conventional steering systems can be obtained.

While thus far the spatial variations have been shown to be achieved by discrete elements, this is not a necessary limitation of the invention. The variation in the shapes of the sensor areas 12 and 18 may also be accomplished by using as a sensing medium a piezoelectric layer 80, FIG. 12, having a spatial variation in the spatial sensitivity so that the sensitivity is higher in the center area 82 than it is at either end 84 and 86. This implements sensor area 12. A second layer with a derivative-matched spatial variation implements rectangular sensor area 18. These two sensitive media 80 and 88 constituting sensor areas 12 and 18, FIG. 13, may be sandwiched between electrodes 90, 92 and 94 to provide suitable outputs to the summing circuits.

Alternatively, sensor area 12 may be made up of electrodes 100, 102, FIG. 14, with a piezoelectric layer 104 between them all cut to have a rhombic shape. The rhombic sensor area 12 is superimposed on the rectangular sensor area 18, which consists of a second layer 106 sandwiched between two more electrodes 108 and 110. In yet another construction, the electrode 112, FIG. 15, and piezoelectric layer 114 may be uniform, while the lower electrode 116 may be shaped to define the rhombic 12*d* and rectangular 18*d* sensor areas. A similar construction may be used with triangular sensor area 12*e* replacing rhombic sensor area 12*d*, FIG. 16.

Although only two derivative matched shadings have been depicted thus far, many different matched shapes may be used. For example, as shown in FIG. 17, the first sensor area may be sinusoidal 120, and the second may be the derivative of the sine, or the cosine 122, sO the transducer charge collection electrode has a contour as shown in FIG. 17.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A wideband, derivative-matched, continuous aperture acoustic transducer, comprising:

a first sensor medium including a first sensor area having a predetermined spatial shaping;

a second sensor medium including a second sensor area having a spatial shading which is the spatial derivative of the spatial shading of said first area; said first and second spatially shaded areas being superimposed and coextensive along the sensing axis; and a pair of electrodes about said first and second sensor mediums.

2. The wideband, derivative-matched, continuous aperture acoustic transducer of claim 1 in which said first and second sensor areas are defined by a said electrode.

3. A wideband, derivative-matched, continuous aperture acoustic transducer, comprising:

a first triangular sensor area having a predetermined spatial shading; and a second rectangular sensor area having a spatial shading which is the spatial derivative of the spatial shading of said first area; said first and second spatially shaded areas being superimposed and coextensive along the sensing axis.

4. A wideband, derivative-matched, continuous aperture acoustic transducer, comprising:

a first sinusoidal sensor area having a predetermined spatial shading; and a second cosinusoidal sensor area having a spatial shading which is the spatial derivative of the spatial shading of said first area; said first and second spatially shaded areas being superimposed and coextensive along the sensing axis.

5. A wideband, derivative-matched, continuous aperture acoustic transducer, comprising:

a first sensor area having a predetermined spatial shading;

a second sensor area having a spatial shading which is the spatial derivative of the spatial shading of said first area; said first and second spatially shaded areas being superimposed and coextensive along the sensing axis; and a third sensor area superimposed on the first and second sensor areas and having a plurality of independent sensor sections.

* * * * *